United States Patent [19]
Bell et al.

[11] 3,915,509
[45] Oct. 28, 1975

[54] IDLER RECOIL SUPPORT BEARING
[75] Inventors: Francis D. Bell, Peoria; Robert L. Shelby, Chillicothe, both of Ill.
[73] Assignee: Caterpillar Tractor Co., Peoria, Ill.
[22] Filed: Sept. 19, 1974
[21] Appl. No.: 507,263

[52] U.S. Cl. ............................. 305/10; 305/31
[51] Int. Cl.² ............................. B62D 55/30
[58] Field of Search ............ 305/10, 22, 31, 25, 30, 305/29, 32; 267/34, 35

[56] References Cited
UNITED STATES PATENTS
3,645,586   2/1972   Piepho .................................. 305/10
3,825,309   7/1974   Krolak ................................. 305/31

*Primary Examiner*—Philip Goodman
*Attorney, Agent, or Firm*—Phillips, Moore, Weissenberger Lempio & Strabala

[57] ABSTRACT

A vehicle has on either side thereof a pair of tubes disposed one inside the other in sliding relation. One of the tubes has a pair of removable bodies associated therewith and in one embodiment of the invention, such bodies define protrusions which engage with slots defined by means associated with the other tubular member. In another embodiment, such bodies define slots, and the other tubular member has associated therewith the protrusions which engage with such slots. In either embodiment, such protrusions and slots cooperate so that one tube may reciprocate relative to the other, but with such protrusions and slots limiting rotative movement of one of the tubular members about its longitudinal axis relative to the other tubular member.

22 Claims, 7 Drawing Figures

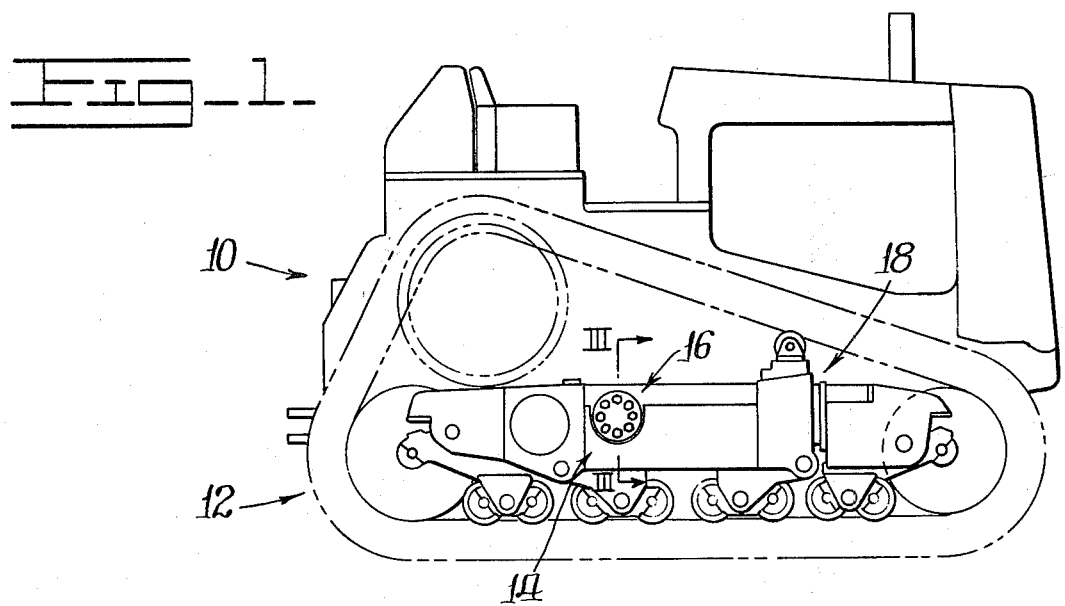
Fig_1_
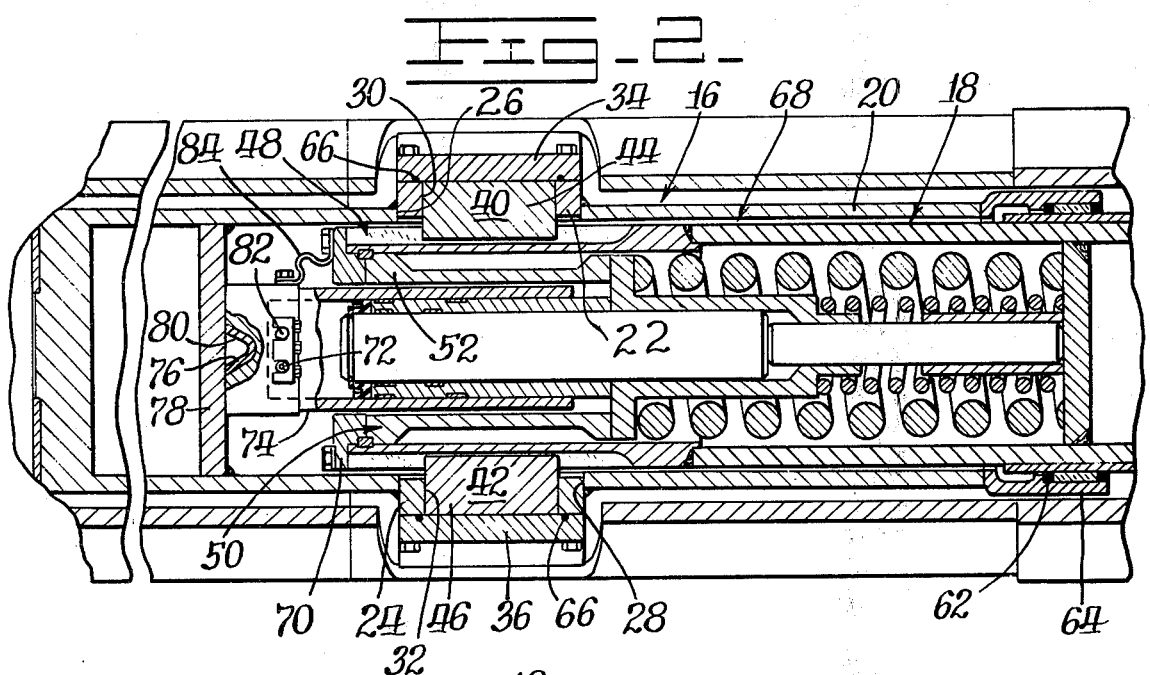
Fig_2_
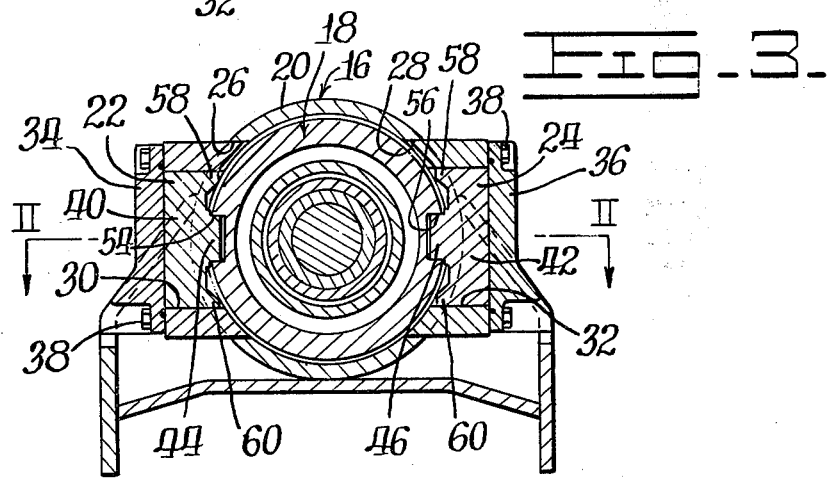
Fig_3_

IDLER RECOIL SUPPORT BEARING

BACKGROUND OF THE INVENTION

This invention relates to a system in a tractor for allowing recoil of tractor idlers, and more particularly to such a system which incorporates sliding tubes for allowing such recoil.

U.S. Pat. No. 3,825,309, and U.S. Pat. No. 3,829,172, both assigned to the assignee of this invention, disclose idler recoil systems incorporating a splined connection between an inner and an outer tube which allows reciprocation of one tube relative to the other, but limits rotative movement of one tube about its longitudinal axis relative to the other tube. While such systems have been found relatively effective in use, it will be understood that it is always desirable to improve on existing designs so as to increase overall manufacturing and operating efficiency. In particular, the splines of the inner tubular member are subjected to relatively great stress and wear, which may in turn result in cracking and, in the device of U.S. Pat. No. 3,829,172, loss of high pressure fluid from a hydraulic adjuster chamber defined within such inner tubular member. It will be understood that variable stress loads in the walls of such a pressure chamber are undesirable because safety margins which would take into account such variation are extremely difficult to calculate.

In addition, the machining of the large number of splines involved in either system disclosed in U.S. Pat. No. 3,829,172 or U.S. Pat. No. 3,825,309 is costly and timeconsuming, and there also exists the problem of lack of and difficulty in providing positive retaining means which would keep the tubular members from inadvertantly sliding apart if an assembled track did not encompass and secure the idlers and sprocket of the vehicle.

It is also to be understood that any slide and guide arrangement generally similar to the type disclosed in these patents should be properly lubricated and protected so as to insure proper operation over a relatively long period of time.

Of more general interest in this area is U.S. Pat. No. 3,343,889 to Bexten, wherein a bar includes a vertical slot entirely therethrough, in which a plate fixed to a cylinder is slidable. It is to be noted that relatively large frictional areas are involved therein, and no lubrication is provided therefor.

SUMMARY OF THE INVENTION

It is accordingly an object of this invention to provide, in a track-type tractor or the like, means for allowing the reciprocation of one tubular member relative to another, meanwhile limiting rotative movement of one tubular member about its longitudinal axis relative to the other tubular member.

It is a further object of this invention to provide, in a track-type tractor or the like, means which while fulfilling the above object, are properly lubricated and protected so as to be operable over a substantially lengthy period of time.

It is a still further object of this invention to provide, in a track-type tractor or the like, means which, while fulfilling the above object, are extremely simple in design, meanwhile insuring safe and effective use of the overall apparatus.

Broadly stated, the invention comprises a frame structure comprising a first generally tubular elongated member, and a second elongated member extending within the generally tubular member and reciprocable therealong and relative thereto. A first protrusion is associated with one of the elongated members, and means are associated with the other elongated member and defining a first slot engageable by the first protrusion. A second protrusion separate from the first protrusion is associated with one of the elongated members, and means are associated with the other elongated member and define a second slot engageable by the second protrusion. At least one of the first protrusion, second protrusion, means defining the first slot, and means defining the second slot is removable from its associated elongated member. The protrusions and slots allow the reciprocation described above, meanwhile limiting rotative movement of the first elongated member about its longitudinal axis relative to the second elongated member.

BRIEF DESCRIPTION OF THE DRAWINGS

These and other objects of the invention will become apparent from a study of the following specification and drawings, in which:

FIG. 1 is a side elevation of a track-type tractor incorporating a first embodiment of the invention;

FIG. 2 is a sectional view taken along the line II—II of FIG. 3;

FIG. 3 is a sectional view taken along the line III—III of FIG. 1;

DESCRIPTION OF THE PREFERRED EMBODIMENTS

Figure 4:
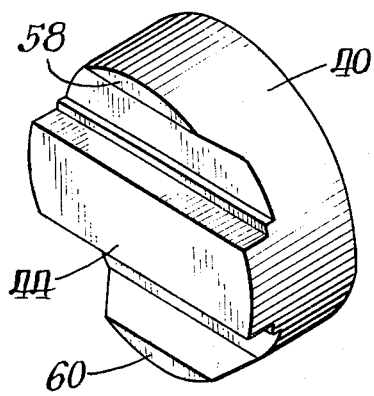
FIG. 4 is a perspective view of the body incorporated in the first embodiment of the invention.

Shown in FIG. 1 is a track-type vehicle 10 having track assemblies on either side thereof, one of which is shown in 12. Such track assembly 12 includes a track frame structure 14 made up of a first track frame portion 16, and a second track frame portion 18. The frame portion 16 comprises a generally tubular elongated member, and the frame portion 18 comprises a generally tubular elongated member which extends within the generally tubular elongated member 16 and is reciprocable therealong and relative thereto. The elongated member 16 is made up of a tubular elongated member portion 20, and a pair of tubular members 22, 24 which are secured by welding to the elongated member 20 in a pair of horizontally aligned bores 26, 28 in the elongated member portion 20. Such tubular members 22, 24 are positioned so as to define first and second generally lateral apertures 30, 32 in the overall generally tubular elongated member 16, extending from outside to inside such generally tubular elongated member 16, extending from outside to inside such generally tubular elongated member 16. Such apertures 30, 32 are spaced 180° apart, being positioned on opposite sides of the elongated member 16. The apertures 30, 32, it is to be noted, are substantially circular in configuration.

First and second covers 34, 36 are removably securable over such apertures 30, 32 by means of bolts 38 as shown. With the covers 34, 36 removed, bodies 40, 42, which are also substantially circular in configuration so as to be rotatable within the apertures 30, 32, and may be retained therein upon the securing of such covers 34, 36 to such tubular members 22, 24. Likewise, removal of the covers 34, 36 allows access to and removal of the bodies 40, 42 from the elongated member 16, if desired. The bodies 40, 42 define protrusions 44, 46 which, with the bodies 40, 42 positioned apertures 30, 32 may be aligned generally parallel to the longitudinal axis of the elongated member 16 through rotation of the bodies 40, 42 with the protrusions 44, 46 substantially 180° apart.

Cooperating means 48, 50 for association with such protrusions 44, 46 are associated with the second elongated member 18. Such cooperating means take the form of a portion 52 of the second elongated member 18 which defines slots 54, 56 disposed on either side thereof, substantially 180° apart, and are positioned so that they are engageable with the protrusions 44, 46 respectively when such bodies 40, 42 are retained in the apertures 30, 32 by the covers 34, 36. As shown in FIGS. 2 and 3, such slots 54, 56 are positioned generally parallel to the longitudinal axis of the elongated member 18, and the protrusions 44, 46 are sized so as to fit closely within the slots 54, 56. It is to be seen that the cooperation of the protrusions 44, 46 and slots 54, 56 allows reciprocation of the first and second elongated members 16, 18 relative to each other, meanwhile limiting rotative movement of one elongated member about its longitudinal axis relative to the other elongated member. Through such means, the frame portions 16, 18 are kept in substantial alignment.

Each body 40, 42 includes upper and lower appendages 58, 60 to provide additional pilot surface for that body in the associated aperture, to resist cocking of that body in the aperture, as well as to provide additional bearing surface to resist vertical loads on the body. Because of the substantially circular configurations of the apertures 30, 32 and bodies 40, 42 fitted therein, each body is free to rotate in its associated aperture, to aid in aligning the longated protrusion with the slot associated therewith at assembly, and to insure that the protrusions 44, 46 follow the slots 54, 56 without binding as the elongated member 16 reciprocates fore and aft relative to the elongated member 18. Providing that such bodies 40, 42 may rotate in accordance with the above description allows for slight misalignment which may take place between associated elements. It is to be noted that the bodies 40, 42 defining the protrusions 44, 46 and the cooperating means 48, 50 defining the slots 54, 56 are enclosed within the generally tubular elongated member 16.

A seal 62 is provided adjacent bearing 64 of elongated tubular member 18, to sealingly connect the elongated member 16 and elongated member 18. The covers 34, 36 are provided with seals 66, so as to sealingly engage the tubular members 22, 24. Such appropriate sealing provides a sealed cavity area 68 between elongated tubular member 16 and elongated tubular member 18 therewithin, which is approximately half filled with oil. Such oil acts as a lubricant in the area of the sliding of the protrusions 44, 46 and cooperating means 48, 50 defining the slots 54, 56. Reciprocation of one elongated member relative to another insures that oil is properly provided to such areas.

It is to be noted that the bodies 40, 42 are of softer material than the cooperating means 48, 50 which define the slots 54, 56. Thus, almost all of the wear which results from the reciprocating motion above described will be on the protrusions 44, 40 of such bodies 40, 42, which it will be seen, are readily replaceable. Such replacement can of course be undertaken upon removal of the covers 34, 36, removal of the bodies 40, 42, insertion of other bodies into the apertures 30, 32, and replacement of the covers 34, 36.

Secured to the elongated member 18 as a portion thereof is an annular flange 70. Such flange 70 is positioned relative to the slots 54, 56 so that upon extreme rightward movement of the elongated member 18 relative to the elongated member 16, flange 70 will contact the protrusions 44, 46 of the bodies 40, 42. Such flange 70 thereby acts as stop means to limit relative movement of the first and second elongated members 16, 18 in one direction. In order to allow further relative movement of the first and second elongated members in such one direction, beyond the position determined by the stop means, the covers 34 are removed, and the bodies 40, 42 are then in turn removed, to allow such further movement.

Pressure applied through a grease fitting 72 associated with a cylinder 74 is used to provide adjustment of the overall track frame. The cylinder 74 is maintained in a vertical position by a "V" shaped member 76 welded to an abutment plate 78 fixed relative to the elongated member 16, and a mating cavity 80 formed in the end of the cylinder 74 to accept the member 76. In order to remove the elongated member 18 from the elongated member 16 for replacement of seals, bearing, etc., the pressure in the cavity of cylinder 74 is vented by partial removal of vent 82. The covers 34, 36 and bodies 40, 42 are then removes as described above, permitting the elongated member 18 to be pulled forward from the elongated member 16. To insure that the cylinder 74 remains on the flange 70 with which it is associated, a cable 84 is secured between the cylinder 74 and flange 70 of the elongated member 16.

Figure 7:
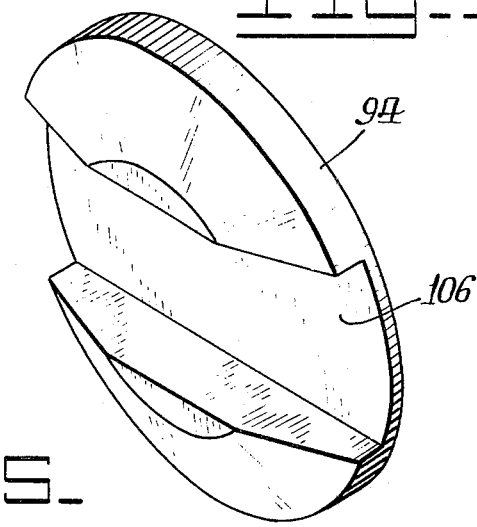
FIG. 7 is a perspective view of a body used in the second embodiment of the invention as shown in FIGS. 5 and 6.
Figure 5:
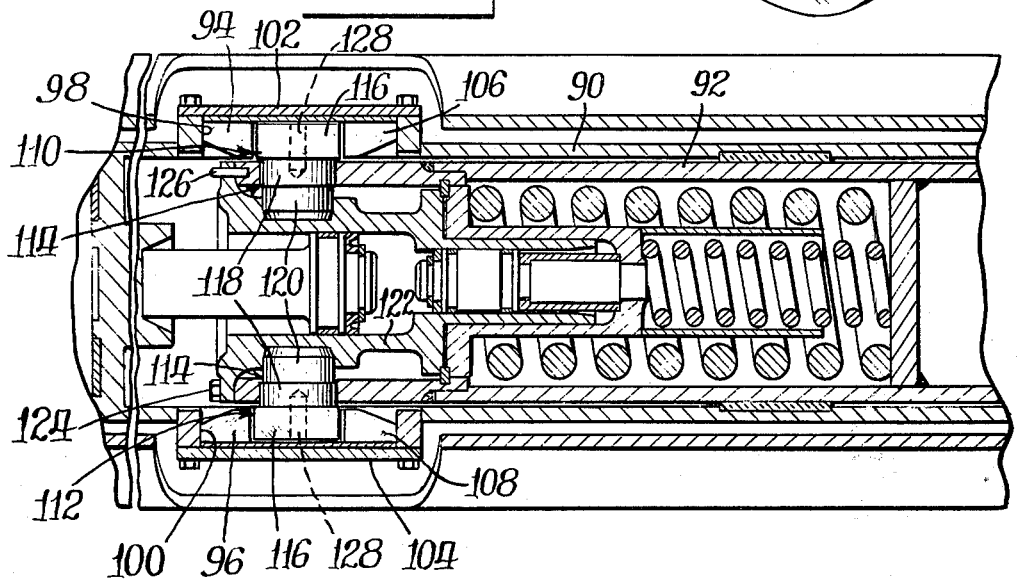
FIG. 5 is a sectional view taken along the line V—V of FIG. 6.
Figure 6:
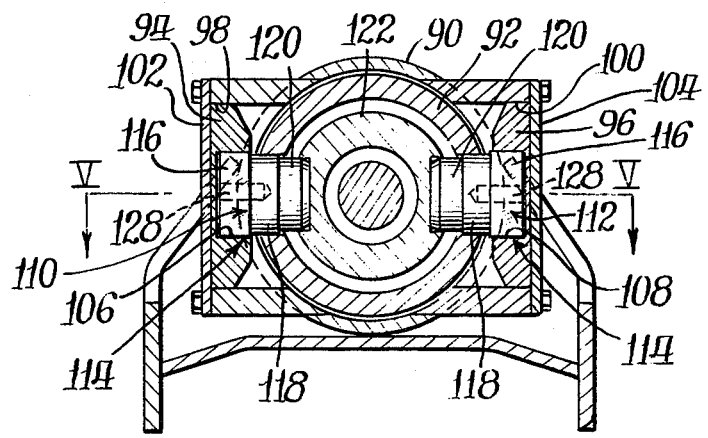
FIG. 6 is a sectional view similar to that shown in FIG. 3, but showing a second embodiment of the invention.

Shown in FIGS. 5, 6 and 7 is another embodiment of the invention. Similar to the previous embodiment, this embodiment includes a first generally tubular elongated member 90, and a second generally tubular elongated member 92 extending within the tubular member 90 and reciprocable therealong and relative thereto. In this embodiment, however, circular bodies 94, 96, retained in circular apertures 98, 100 by means of covers 102, 104, define slots 106, 108 respectively (see FIG. 7). Such bodies 94, 96 are of course removable from the elongated member 16 in the same manner as the bodies described in relation to the previous embodiment. In this embodiment, the cooperating means comprise a pair of members 110, 112, each comprising a main portion 114 and a protrusion 116, such main portion 114 including a circular portion 118 which is a light press fit in a hole defined by the elongated member 90. The main portion 114 also includes a second circular portion 120 which is a light press fit in a circular hole defined by yet another tubular member 122, so that each member 110, 112 is removably fixed to the elongated member 92 and the member 122. With such members 110, 112 fixed in place as shown in FIGS. 5 and 6, the protrusions 116 are engaged with the slots 116, 108, to allow such reciprocating motion of the elongated member 90 relative to the elongated member 92, meanwhile limiting rotative movement one elongated member about its longitudinal axis relative to the other elongated member. The protrusions 116 are square in configuration and next properly in the complimenting slots 106, 108. Coupling bolts 124 and index pins 126 connect the elongated member 92 and the tubular member 122. However, most torsional loading is absorbed by the main portions 114 of the members 110, 112, each main portion 114, as described above, being a light press fit in the holes of the members 92, 122 associated therewith. Thus, the coupling bolts 124 and index pins 126 are substantially isolated from such torsional loading.

Detachment of the covers 102, 104, similar to the previous embodiment, allows for inspection and/or service of the bodies 94, 96 and protrusions 116. If wear is sufficient on such protrusions 116, the members 110, 112 may be rotated. The removal and rotation of such members 110, 112 can be effected by threadably attaching suitable tools into puller holes 128 provided in each protrusion. Such operation can be done conveniently and without disrupting any other part of the structure.

It is again to be seen that, since the apertures 98, 100 and bodies 94, 96 are substantially circular in configuration, alignment of the bodies 94, 96 relative to the protrusions 116 is promoted, all as described in relation to the previous embodiment. Also similar to the previous embodiment, a level of lubricating fluid is contained within the tubular elongated member 90, and appropriate seals are provided, so that adequate lubrication is assured between the protrusions 116 and the bodies 94, 96 defining the slots 106, 108.

What is claimed is:

1. A frame structure comprising:
a first generally tubular elongated member;
a second elongated member extending within the generally tubular elongated member and reciprocable therealong and relative thereto;
a first protrusion associated with one elongated member, and means associated with the other elongated member defining a first slot engageable by said first protrusion;
a second protrusion separate from the first protrusion and associated with one elongated member defining a second slot engageable by said second protrusion, at least one of said first protrusion, second protrusion, means defining first slot, and means defining said second slot being removable from its associated elongated member;
said protrusions and slots allowing said reciprocation, meanwhile limiting rotative movement of the first elongated member about its longitudinal axis relative to the second elongated member.

2. The structure of claim 1 wherein the first and second separate protrusions and means defining the first and second slots engageable therewith are enclosed within the first generally tubular elongated member.

3. The structure of claim 1 wherein the first and second separate protrusions are mounted to the first elongated member and are removable therefrom.

4. The structure of claim 1 wherein the means defining the first and second slots are mounted to the first elongated member and are removable therefrom.

5. A frame structure comprising:
a first generally tubular elongated member defining at least one generally lateral aperture therein from outside to inside the first generally tubular elongated member;
a second elongated member extending within the first generally tubular elongated member and reciprocable therealong and relative thereto;
a body positionable in said aperture;
cooperating means associated with said second elongated member;
one of said body and cooperating means defining a protrusion;
the other of said body and cooperating means defining a slot with which said protrusion is engageable with said body so disposed in said aperture;
means for retaining said body in said aperture, said protrusion and slot allowing said reciprocation, meanwhile limiting rotative movement of the first elongated member about its longitudinal axis relative to the second elongated member.

6. The structure of claim 5 wherein the aperture defined by the first elongated member is substantially circular, and the body is substantially circular in configuratioin and sized to rotatably fit within said circular aperture.

7. The structure of claim 6 wherein said body defines said protrusion.

8. The structure of claim 6 wherein said body defines said slot.

9. The structure of claim 5 wherein the means for retaining the body in said aperture comprise removable cover means the removal of which allows access to and removal of said body from said first elongated member.

10. The structure of claim 5 wherein the first elongated member defines a second generally lateral aperture therein from outside to inside the first elongated generally tubular member, the first-mentioned and second apertures being positioned on one and the other opposite sides of the first elongated member, and further comprising a second body positionable in said second aperture, second cooperating means associated with said second elongated member, one of said second body and second cooperating means defining a second protrusion, the other of said second body and second cooperating means defining a second slot with which said second protrusion is engageable with said second body disposed in said second aperture, and means for retaining said second body in said second aperture, said protrusions and slots allowing said reciprocation, meanwhile limiting rotative movement of the first elongated member about its longitudinal axis relative to the second elongated member.

11. The structure of claim 10 wherein the first and second apertures defined by the first elongated member are substantially circular, and the first-mentioned and second bodies disposed therein are substantially circular in configuration so as to rotatably fit within said first and second apertures respectively.

12. The structure of claim 11 wherein said first and second bodies define said first-mentioned and second protrusions respectively.

13. The structure of claim 11 wherein said first and second bodies define said first-mentioned and second slots respectively.

14. The structure of claim 12 wherein the means for retaining the first and second bodies in said first and second apertures comprise first and second removable cover means securable relative to said first elongated member, the removal of which allows access to and removal of said first and second bodies respectively from said first elongated member.

15. The structure of claim 13 wherein the means for retaining the first and second bodies in said respective first and second apertures comprise first and second removable cover means securable relative to said first and second elongated members, the removal of which allows access to and removal of said first and second bodies respectively from said first elongated member.

16. The structure of claim 1 and comprising cooperating means comprising a main portion and said protrusion, the elongated member with which said protrusion is associated defining a hole within which said main portion is positionable so as to be removably fixed thereto.

17. The structure of claim 16 and further comprising a third member defining a hole, the main portion being positionable in said holes so as to be removably fixed to said elongated member with which said protrusion is associated and said third elongated member.

18. The structure of claim 17 wherein said holes are substantially circular.

19. The structure of claim 5 wherein said body defines said protrusions and further comprising stop means secured relative to the second elongated member and positioned to be contacted by the body positioned in the aperture to limit relative movement of the first and second elongated member in one direction.

20. The structure of claim 19 wherein the means for retaining the body in the aperture comprise removable means the removal of which allows removal of the body from the first elongated member, relative movement of the first and second elongated members in said one direction, beyond the position determined by the stop means is allowed.

21. The structure of claim 5 wherein the body is of softer material than the cooperating means.

22. The structure of claim 21 wherein said body defines said protrusion.

* * * * *

UNITED STATES PATENT OFFICE
CERTIFICATE OF CORRECTION

Patent No. 3,915,509           Dated Oct. 28, 1975

Inventor(s) Francis D. Bell et al

It is certified that error appears in the above-identified patent and that said Letters Patent are hereby corrected as shown below:

Column 5, claim 1, line 47, after "member" insert --and means associated with the other elongated member--.

Signed and Sealed this twentieth Day of April 1976

[SEAL]

Attest:

RUTH C. MASON
*Attesting Officer*

C. MARSHALL DANN
*Commissioner of Patents and Trademarks*